Figure 1:
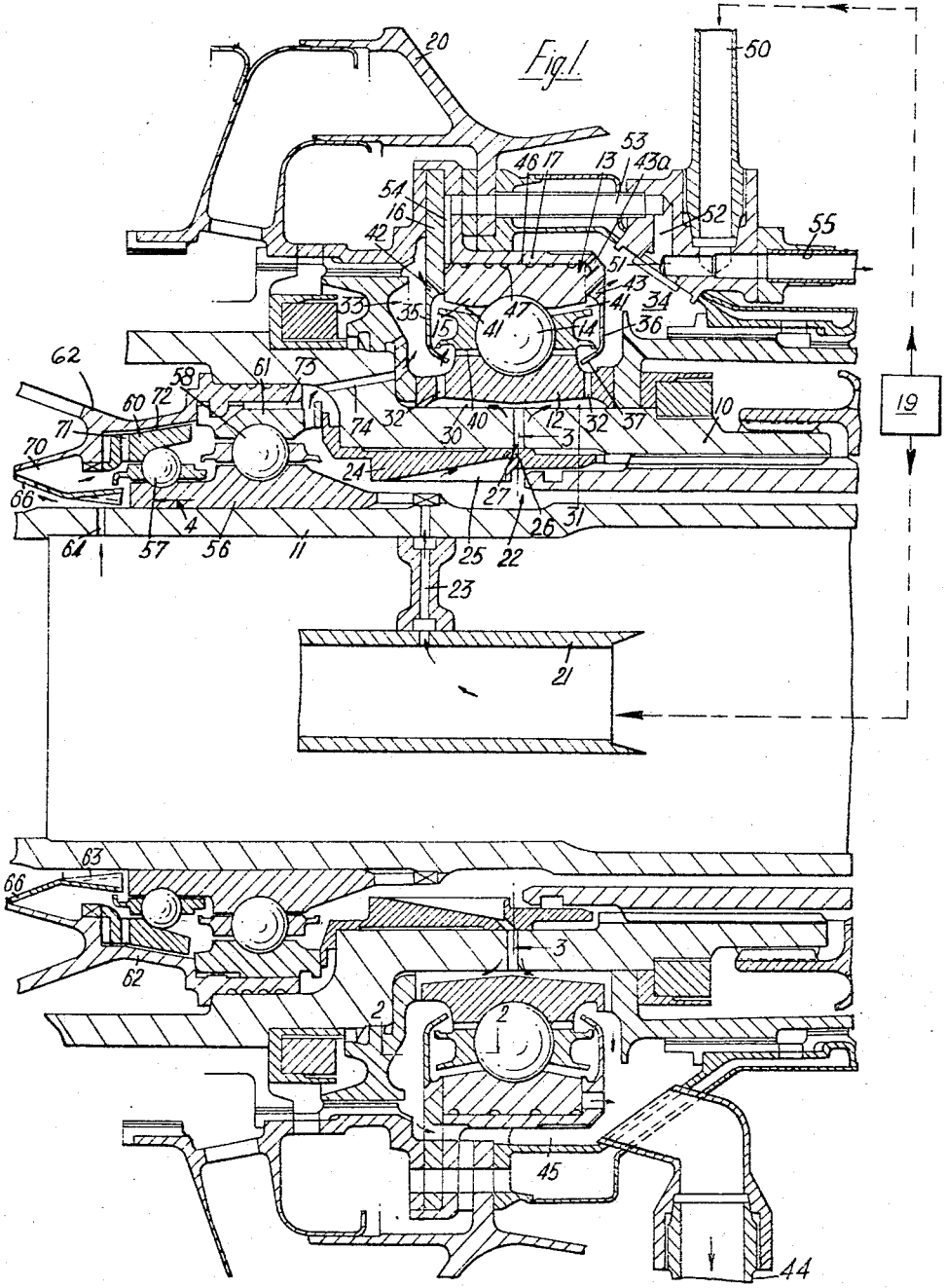

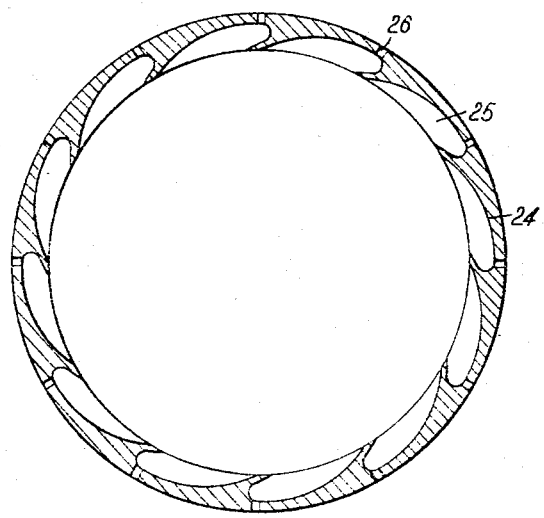
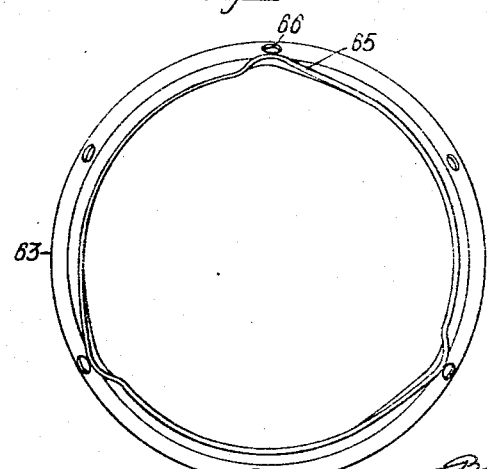

Fig.5.

United States Patent Office 3,276,827
Patented Oct. 4, 1966

3,276,827
BEARING ASSEMBLY
Bernard Diver and Norman Robert Robinson, Derby, and Wilfred Henry Wilkinson, Turnditch, Derby, England, assignors to Rolls-Royce Limited, Derby, England, a company of Great Britain
Filed Dec. 23, 1963, Ser. No. 332,804
Claims priority, application Great Britain, Jan. 9, 1963, 1,087/63
6 Claims. (Cl. 308—187)

This invention concerns a bearing assembly.

According to the present invention, there is provided a bearing assembly comprising an outer race which is mounted in a first member, an inner race which is mounted concentrically within said outer race and which is spaced therefrom by rolling elements which are in rolling contact with said inner and outer races, a second member which is mounted in said inner race, said first and second members being relatively rotatable, first duct means through which lubricant may pass in contact with at least a substantial proportion of the respective circumferential surface(s) of said inner and/or said outer race(s) which is or are radially spaced from said rolling elements, so as to effect cooling of said surface(s), second duct means through which lubricant may pass to the rolling elements to effect lubrication thereof, and means for supplying said first and second duct means with lubricant from a common source.

The term "rolling elements" as used in this specification is intended to include ball bearings, roller bearings, needle bearings and the like.

Preferably there are common scavenge means to which may pass lubricant which has flowed through said first and second duct means.

Alternatively, at least a portion of the lubricant which has flowed past the said circumferential surface(s) is supplied to the said second duct means.

Thus the bearing assembly may comprise at least one chamber into which passes the lubricant which has flowed through said first duct means, the or each said chamber having a lubricant duct associated therewith which constitutes the said second duct means, the lubricant duct communicating with its chamber by way of a flow metering device which meters the amount of lubricant which may pass to the rolling elements. The flow metering device may, for example, comprise a slotted member.

The said second member is preferably constituted by rotatable shafting and, in this case, the said first duct means preferably communicates with the internal surface of the rotatable shafting by way of one or more lubricant passages, there being means for providing the said internal surface with lubricant which, in operation, will be centrifugally forced through said lubricant passage(s) to said first duct means.

The said internal surface is preferably recessed to form at least one pocket which communicates with a said lubricant passage, the or each said pocket, in operation, directing the lubricant into the respective lubricant passage.

The first duct means may, if desired, extend alongside one only of said races, a lubricant conduit being provided through which lubricant may pass in contact with the said circumferential surface of the other race, said lubricant conduit communicating the said common scavenge means.

The invention also comprises a gas turbine engine provided with at least one bearing assembly as set forth above.

The invention is illustrated, merely by way of example, in the accompanying drawings, in which:

FIGURE 1 is a broken away section of part of a first embodiment of a gas turbine engine provided with bearing assemblies according to the present invention, FIGURE 2 is a broken away section taken on the line 2—2 of FIGURE 1, FIGURE 3 is a section taken on the line 3—3 of FIGURE 1, FIGURE 4 is a view looking in the direction of the arrow 4 of FIGURE 1, and FIGURE 5 is a broken away section of part of a second embodiment of a gas turbine engine provided with bearing assemblies according to the present invention.

Referring first to FIGURES 1-4 of the drawings, a gas turbine engine is provided with a shaft 10 on which are mounted a high pressure compressor and a high pressure turbine (not shown). Concentrically mounted and nested within the shaft 10 is a shaft 11 on which are mounted a low pressure compressor and a low pressure turbine (not shown).

The shaft 10, adjacent its rear end, is mounted concentrically within an inner race 12 of a thrust bearing 13. The bearing 13, which constitutes the main thrust bearing of the engine, has ball bearings 14 which are in rolling contact with the inner race 12 and with an outer race 15 which is mounted concentrically about the inner race 12. The outer race 15 is mounted within two annular members 16, 17 which are secured to each other and to fixed structure 20.

A source of lubricant, diagrammatically shown at 19, supplies lubricant to a lubricant pipe 21 which is mounted concentrically within the shaft 11. Between the shafts 10, 11 there is a space 22 which, in operation, is centrifugally supplied with lubricant from the lubricant pipe 21 by way of radially extending lubricant passages 23.

Mounted within the shaft 10 is a sleeve 24 which bounds the space 22 and which is recessed to form a plurality of angularly spaced apart pockets 25. Each of the pockets 25 communicates with a drilling 26 and is shaped to direct lubricant centrifugally into the respective drilling 26. Each drilling 26 communicates with a lubricant passage 27 which leads to the mid region of an axially extending groove 30 in the inner circumferential surface 31 of the inner race 12. The outer ends of each groove 30 communicate by way of drillings 32 with annular chambers 33, 34 which are respectively disposed immediately upstream and downstream of the bearing 13.

It will be appreciated that the lubricant flow through the grooves 30 will serve to cool the inner race 12 by taking away heat which has been conducted thereto through the shaft 10 and/or has been generated within the bearing.

The annular members 16, 17 have slotted portions 35, 36 respectively which are respectively arranged to form boundary surfaces of the annular chambers 33, 34. The portions 35, 36 have slots 37 therein which serve to give a very fine metering control of a flow of lubricant therethrough from the drillings 32 to lubricant ducts 40 leading to the ball bearings 14.

Lubricant which has been used in lubricating the ball bearings 14 passes through lubricant ducts 41 and through drillings 42, 43 in the annular members 16, 17 respectively to the annular chambers 33, 34 respectively. Lubricant which has thus been used in cooling and lubricating the bearing 13 passes to a scavenge passage 44. The latter communicates directly with the annular chamber 34 and communicates with the annular chamber 33 by way of a passage 45.

The outer circumferential surface 46 of the outer race 15 has grooves 47 therein which are supplied with lubricant from a lubricant conduit 50 by way of conduits 51, 52, 53, 54. The lubricant which has flowed through the grooves 47 and which has thus cooled the outer race 15 passes through drillings 43a into the annular chamber 34 and thence to the scavenge passage 44.

Some of the lubricant from the lubricant conduit 50 may pass via a conduit 55 to the rear bearing (not shown) of the engine.

The shaft 11 is mounted concentrically within a sleeve 56 which constitutes an inner race of inter-shaft ball bearings 57, 58. The latter have outer races 60, 61 respectively which are mounted within a sleeve member 62 which is itself mounted within the shaft 10.

The sleeve member 62 carries a substantially frusto-conical member 63 (best seen in FIG. 4) which is provided with a series of holes 66. Lubricant from the interior of the shaft 11 may pass centrifugally to the frusto-conical member 63 by way of drillings 64 in the shaft 11, the drillings 64 communicating with the lubricant pipe 21 by means not shown. The frusto-conical member 63 is formed with scoops 65 (FIG. 4) which direct a portion of the lubricant which passes onto the frusto-conical member 63 from the drillings 64 to the ball bearings 57 and thence to the ball bearings 58, after which the lubricant is passed via drillings 74 in the shaft 10 to the annular chamber 33 and finally via the passage 45 to the scavenge passage 44.

Some of the lubricant which has passed through the drillings 64 is centrifuged up the inner surface of the frusto-conical member 63 and flows through the holes 66 to an annular chamber 70 immediately upstream of the ball bearings 57. This flow of lubricant passes from the annular chamber 70 and via drillings 71 to grooves 72 provided in the outer circumferential surface of the outer race 60. Lubricant which has flowed through the grooves 72, and which has thus cooled the outer race 60, passes axially through grooves 73 in the outer circumferential surface of the outer race 61 so as to cool the latter. This lubricant then passes into the annular chamber 33 by way of the drillings 74 in the shaft 10.

It will be seen that, where possible in practice, the lubricating oil supply to each bearing is divided into two flows, one flow serving to lubricate the rolling elements of the bearing and the other flow serving to cool the inner or the outer race. It is preferable that the oil which has served as a cooling medium is not afterwards passed to the rolling elements to serve as a lubricant.

Referring now to FIGURE 5, a gas turbine engine is provided with a shaft 80 on which are mounted a high pressure compressor and a high pressure turbine (not shown). Concentrically mounted within the shaft 80 is a shaft 81 on which are mounted a low pressure compressor and a low pressure turbine (not shown).

The shaft 80, adjacent its rear end, is mounted concentrically within an inner race 82 of the main thrust bearing 83 of the engine. The bearing 83 has ball bearings 84 which are in rolling contact with the inner race 82 and with an outer race 85 which is mounted concentrically about the inner race 82. The outer race 85 is secured to fixed structure 86.

Between the shafts 80, 81 there is a space 87 which, in operation, is centrifugally supplied with lubricant from the interior of the shaft 81 by way of radially extending lubricant passages 90 in the shaft 81.

Mounted within the shaft 80 is an annular member 91 which extends into the space 87 and which is provided with a plurality of angularly spaced apart pockets 92. Some of the pockets 92 communicate with a drilling 93 into which the lubricant is centrifuged, the remaining pockets communicating with a drilling 93a. Each drilling 93 communicates with a lubricant passage 94. The lubricant passage 94 leads via drillings in the shaft 80 to the mid region of an axially extending groove 95 provided in the inner circumferential surface 96 of the inner race 82. The outer ends of each groove 95 communicate with annular chambers 100, 101 which are respectively disposed immediately upstream and downstream of the bearing 83.

It will be appreciated that the lubricant flow through the grooves 95 will serve to cool the inner race 82.

Some of the grooves 95 communicate with passages 102 in the inner race 82, which open to annular chambers 97 defined by shoulders 98. Lubricant ducts 99 leading to the ball bearings 84 communicate with chambers 97 and, thus, lubricant supplied to the passages 102 effect lubrication of the ball bearings 84. After the lubricant has effected the lubrication of the ball bearings 84, it passes into the annular chambers 100, 101. Lubricant which has thus been used in cooling and lubricating the bearing 83 passes from the annular chambers 100, 101, to a scavenge passage (not shown).

The outer circumferential surface 106 of the outer race 85 has grooves 107 therein which are supplied with lubricant from a lubricant conduit 110 by way of conduits 111, 112. The lubricant which has flowed through the grooves 87 and which has thus cooled the outer race 85 passes into the annular chamber 101, and thence to the said scavenge passage.

Some of the lubricant from the lubricant conduit 110 may pass via a conduit 113 to the rear bearing (not shown) of the engine.

The shaft 81 is mounted concentrically within a sleeve 114 which constitutes an inner race of inter-shaft ball bearings 115, 116. The latter have outer races 117, 118 respectively which are mounted within a sleeve member 120 which is itself mounted within the shaft 80.

Lubricant from the interior of the shaft 81 may pass centrifugally, via radially extending passages 121 in the shaft 81, to an annular chamber 122 within the sleeve member 120.

Some of the lubricant in the chamber 122 flows therefrom along a frusto-conical surface provided on the sleeve member 120 and through the bearing 115, so as to lubricate the latter. A proportion of the lubricant which flows along the said frusto-conical surface passes through drillings 120a, provided in the said frusto-conical surface, to an annular chamber 124a.

The lubricant from the chamber 124a flows successively through grooves 124, 125 provided in the outer circumferential surfaces of the outer races 117, 118 respectively, so as to cool the latter, and then flows via drillings 123 and the chamber 100 to the said scavenge passage.

The bearing 116 is lubricated by lubricant from the pockets 92 which communicate with drillings 93a, which lubricant is picked-up by an inwardly directed lip 126 provided on the cage member of the bearing 116. After lubricating the bearing 116, the lubricant passes through apertures 118a and then through the drillings 123 and the chamber 100 to the said scavenge passage.

Instead of providing the inner race 82 with the passages 102 for supplying the lubricant to the balls 84 these passages may be dispensed with and replaced by passages 102a which communicate directly with the balls 84. This ensures that the lubricant which passes to the balls 84 through the passages 102a has not received heat by cooling the inner race 82.

We claim:

1. A bearing assembly comprising a first member, an outer race which is mounted in the first member, an inner race which is mounted concentrically within said outer race and which is spaced therefrom, rolling elements which are in rolling contact with said inner and outer races, a second member which is mounted in said inner race, said first and second members being relatively rotatable, first duct means through which lubricant passes in contact with at least a substantial proportion of the respective circumferential surface of one only of said races to effect cooling thereof, said circumferential surface being spaced from said rolling elements, a lubricant conduit through which lubricant passes in contact with the said circumferential surface of the other race, second duct means, independent of at least one of said first duct means and said lubricant conduit, through which lubricant passes to the rolling elements to effect lubrication thereof, a common source of lubricant, means for supplying said first and second duct means with lubricant from said common source of lubricant, and common scavenge means to which passes lubricant which has flowed through said first and second duct means and said lubricant conduit.

2. A bearing assembly as claimed in claim 1 in which said second duct means is independent of both said first duct means and said lubricant conduit whereby lubricant passing to the rolling elements to effect lubrication thereof has not received heat as a coolant.

3. A bearing assembly as claimed in claim 1 including at least one chamber into which lubricant passes from said first duct means, and a flow metering device carried in said chamber for metering the amount of lubricant passing to said rolling elements from said second duct means.

4. A bearing assembly as claimed in claim 3 in which said flow metering device comprises a slotted member carried by the outer race.

5. A bearing assembly as claimed in claim 1 in which said second member comprises a hollow rotatable shaft having a substantially cylindrical internal surface and in which at least one lubricant passage communicates with said internal surface and with said first duct means, said common source of lubricant providing the said internal surface with lubricant which is centrifugally forced through said lubricant passage to said first duct means.

6. A bearing assembly as claimed in claim 5 in which the said internal surface is recessed to form at least one pocket which communicates with a said lubricant passage, the said pocket, in operation, directing the lubricant into the respective lubricant passage.

References Cited by the Examiner

UNITED STATES PATENTS 2,911,267   11/1959   Small _____ 308—187

FOREIGN PATENTS 1,093,768   11/1954   France.
644,930   10/1950   Great Britain.
764,860   1/1957   Great Britain.
781,085   8/1957   Great Britain.
255,481   10/1927   Italy.

DAVID J. WILLIAMOWSKY, *Primary Examiner.*

FRANK SUSKO, *Examiner.*